(12) United States Patent
Lee

(10) Patent No.: US 6,773,602 B2
(45) Date of Patent: Aug. 10, 2004

(54) MANUFACTURING APPARATUS FOR THE PRODUCTION OF MAGNETIZED WATER AND ITS METHOD

(75) Inventor: Suk-Keun Lee, Gangneung-shi (KR)

(73) Assignee: Life Magnetized Water Co., Ltd., Seoul (KR)

( * ) Notice: Subject to any disclaimer, the term of this patent is extended or adjusted under 35 U.S.C. 154(b) by 170 days.

(21) Appl. No.: 10/048,241

(22) PCT Filed: May 24, 2001

(86) PCT No.: PCT/KR01/00862
§ 371 (c)(1),
(2), (4) Date: Jul. 22, 2002

(87) PCT Pub. No.: WO01/90004
PCT Pub. Date: Nov. 29, 2001

(65) Prior Publication Data
US 2002/0179536 A1 Dec. 5, 2002

(30) Foreign Application Priority Data
May 24, 2000 (KR) ........................................ 2000-28189
May 23, 2001 (KR) ........................................ 2001-28364

(51) Int. Cl.$^7$ ................................................ C02F 1/48
(52) U.S. Cl. ........................ 210/695; 210/222; 210/85; 210/96.1; 210/138; 210/149; 204/555; 204/661
(58) Field of Search ................................. 210/695, 222, 210/85, 96.1, 138, 149; 204/554, 555, 660, 661

(56) References Cited

U.S. PATENT DOCUMENTS

| | | | | |
|---|---|---|---|---|
| 4,299,701 A | * | 11/1981 | Garrett et al. | ............... 210/222 |
| 5,368,748 A | | 11/1994 | Sanderson | |
| 5,816,058 A | | 10/1998 | Lee et al. | |

FOREIGN PATENT DOCUMENTS

| JP | 1242561 | 9/1989 |
|---|---|---|
| KR | 1996-034551 | 11/1996 |

* cited by examiner

Primary Examiner—David A. Reifsnyder
(74) Attorney, Agent, or Firm—Meyertons, Hood, Kivlin, Kowert & Goetzel, P.C.; Eric B. Meyertons

(57) ABSTRACT

A device and a method for production of magnetized water by changing the arrangement of molecules of water takes advantage of the phenomenon that molecules of water form clusters and become enriched in a pulsating magnetic field. The device may include a chamber, for placing a container of purified water in, wound with coils of wire a predetermined number of rounds; a means of supplying power to convert originally supplied alternating current of electricity into pulsating direct current signals and impress them on said coils for induction of a pulsating magnetic field to said chamber; a means of cooling said chamber; a means of sensing changes in temperature of said coils; a means of measuring time to gauge the time of magnetization of said purified water; and a means of control to stop input of direct current pulsating signals when the time spent on magnetizing has reached a preset time.

24 Claims, 20 Drawing Sheets

MANUFACTURING APPARATUS FOR THE PRODUCTION OF MAGNETIZED WATER AND ITS METHOD

BACKGROUND OF THE INVENTION

1. Field of the Invention

The present invention relates to a device and a method for production of magnetized water and, in particular, to a device and a method for its production by making use of the phenomenon that molecules of water form clusters and concentrate themselves in a field of pulsating magnetism.

2. Description of Related Art

Magnetized water is more significant for showing the characteristics of a peculiar water through change of the arrangement of its molecules under the influence of magnetism than the fact that its molecules gain a magnetic trait by magnetization. Various studies and research have so far been made about the physicochemical characteristics of magnetized water.

For example, it has been reported that when water is magnetized and used in industries, the scale caused by the water inside pipes decreases. If magnetized water is used in rinsing mouths, fewer dental calculi result. For another example of biological reactions in living bodies, there has been a report that in magnetized water the activity of glutamate decarboxylase is greater by some 30% than in ordinary water. There have been many other reports on the virtues of magnetized water.

Much research has been made of uses of molecules of water in living bodies. It is known that in most processes of metabolism in a living body, such biochemical reactions as syntheses and degradation of protein or nucleic acid, as well as storage and release of energy, take place through the reactions of molecules of water in the process of their rearrangement. However, it is also known that such biochemical reactions of molecules of water do not take place by molecules of water in direct reaction with other biological substances. Suitable solutes, which function as a buffer, are necessary for the reactions to take place. Water, a main solvent in a living body, has such solutes dissolved in it, such as $Na^+$, $K^+$, $Ca^{++}$, $Mg^+$, $Zn^{++}$, $Fe^-$, $SO4^-$, $PO4^-$, $Cl^-$, etc., playing the role of a buffer by keeping the solvent's pH or osmotic pressure to a certain level. These solutes are capable of reacting with molecules of water and changing their arrangement.

To explain in further detail, a sodium ion, $Na^+$, and a potassium ion, $K^+$, bring about in a living body quite opposite biochemical reactions. $Na^+$, by reaction with molecules of water, assumes an arrangement whereby the $Na^+$ is encircled by the water molecules, resulting in dispersion of the water molecules to assemble around the $Na^+$, causing a swelling of the arrangement of molecules of water. The water's osmotic pressure increases, weakening the dipolarity of water by forcefully attracting the molecules of water, followed by a decrease of the water's reaction with other solutes. $K^+$ assumes an arrangement encircling molecules of water. Gathering the molecules of water close together group by group forms clusters of molecules of water.

According to the results of studies through NMR (nuclear magnetic resonance) of the clusters of molecules of water existing on the inner walls of endoplasmic reticulum or mitochondria in living cells, it has been learned that, compared with the constituents of the substrate of a cell, the clusters of molecules of water are in greater concentration. This can be explained by stating that potassium ions, $K^+$, concentrate the clusters of molecules of water and facilitate the reaction of the resultant concentrated molecules of water with structures of endoplasmic reticulum or mitochondria within cells. Accordingly, it can also be said that a smooth intercellular metabolism takes place through the phenomena of concentration of the clusters of molecules of water.

SUMMARY OF THE INVENTION

Embodiments of a device and a method for production of magnetized water for metabolism in a living body is described. The arrangement of molecules of water may be changed by a pulsating magnetic field, through formation of clusters of molecules of water, and the concentration and maintenance of magnetic properties for a certain length of time.

A device for production of magnetized water may include a chamber, which houses a vessel containing purified water, an outer wall of which is wound with coils of wire by a certain number of rounds; a means of supplying power, which converts alternating current into a series of pulsating direct current signals with a preset frequency to impress said coils in order to generate a pulsating magnetic field inside said chamber; a means of cooling placed outside said chamber to cool heat caused by said coils; a means of sensing temperature to detect changes of temperature caused by said coils; a means of measuring time to measure time of magnetization of said purified water; and a means of control, which compares the time spent on magnetization with a preset time. Said power supply means breaks off the impression of said pulsating DC signals when a preset time is reached.

The device may further include a water tank placed outside and coupled to said chamber. The water tank may receive a supply of water from an outside source. The water in said tank is magnetized in said chamber and circulated to said tank. Said tank may also include a means of outlet to discharge the magnetized water outside with ease.

A method for production of magnetized water may include a magnetism having a certain intensity and pulsating frequency with a preset frequency. The magnetism is impressed on purified water contained in a tightly closed vessel. The impression with said magnetism is continued as a spin arrangement of the molecules of water keeps unchanged. The molecules of water are made to form clusters, whereby enriched magnetized water is obtained.

BRIEF DESCRIPTION OF DRAWINGS

Objects and advantages of the invention will become apparent upon reading the following detailed description and upon reference to the accompanying drawings in which.

Figure 1:
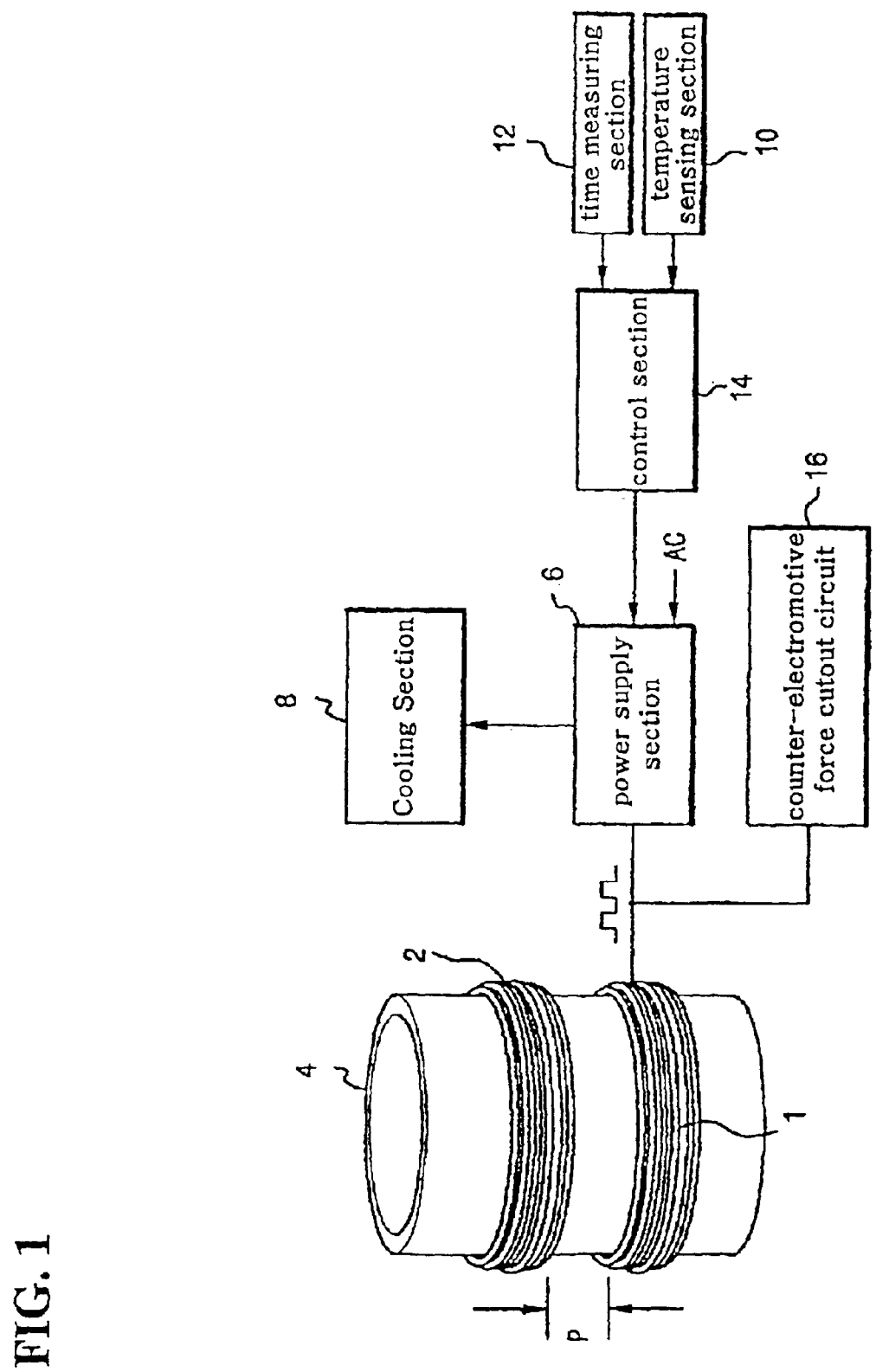
FIG. 1 is a drawing to illustrate a device for production of magnetized water in Embodiment Example 1.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

FIG. 1 illustrates Embodiment Example 1 of a device for production of magnetized water. Said device may include, as is shown in the drawing, chamber 4, which houses a vessel to contain purified water inside. Chamber 4 may be wound with coils of wire by a certain number of rounds. The device may also include power supply section 6, which converts alternating current (AC) of electricity into pulsating direct current (DC) signals for impression on said coils to induce a magnetic field inside of said chamber 4. Cooling section 8 may be placed outside said chamber 4 to cool the heat caused by said coils. Temperature sensing section 10 may be used to detect changes of temperature caused by said coils. Time measuring section 12 may be included to measure the time spent on magnetization of the purified water. Control section 14 may control said power supply section 6 in accordance with the temperature detected by said temperature sensing section 10 and the time of magnetization measured by said time measuring section 12.

Chamber 4 may be of a vertical structure large enough to house a vessel (e.g., a 1-liter PET bottle). Chamber 4 may be formed of nonferrous metals capable of inducing magnetism of a proper intensity.

An embodiment may include counter-electromotive force cutoff circuit 16 between said coils and power supply section 6 to block intrusion of counter-electromotive force from said coils and to shield said power supply section 6.

To minimize magnetic field offset effects at a central part of said coils by influence of polarity, second coil 2 may be connected in series, at an interval P, with first coil 1, which receives said pulsating DC signals from said power supply section 6. First coil 1 and said second coil 2 may be wrapped with a shielding screen to block counter-electromotive force when the pulsating magnetic field is induced.

Power supply section 6 may convert alternating current into a direct current about 16 to about 24V supply for peripheral devices, (e.g., said cooling section 8). Power supply section 6 may generate a sufficient pulsating magnetic field in a short time and convert said alternating current into DC signals pulsating at about 3 to about 7 Hz. The DC signal is input to said first coil 1, lest the counter-electromotive force which is generated inside the coils should offset said generated magnetic field. The input and output terminals may be provided with a double fuse device for operator safety.

Cooling section 8 may be placed outside said chamber 4. Cooling section 8 may include an air-cooling fan and a circulatory air-passage (not shown in the drawings).

A tightly closed vessel containing purified or twice-filtered water may be placed in said chamber 4. Power is turned on and power supply section 6 converts the alternating current (AC), supplied under the control of said control section 14, into DC signals pulsating at about 3 to about 7 Hz. The DC signals are input to said first coil 1.

Figure 2:
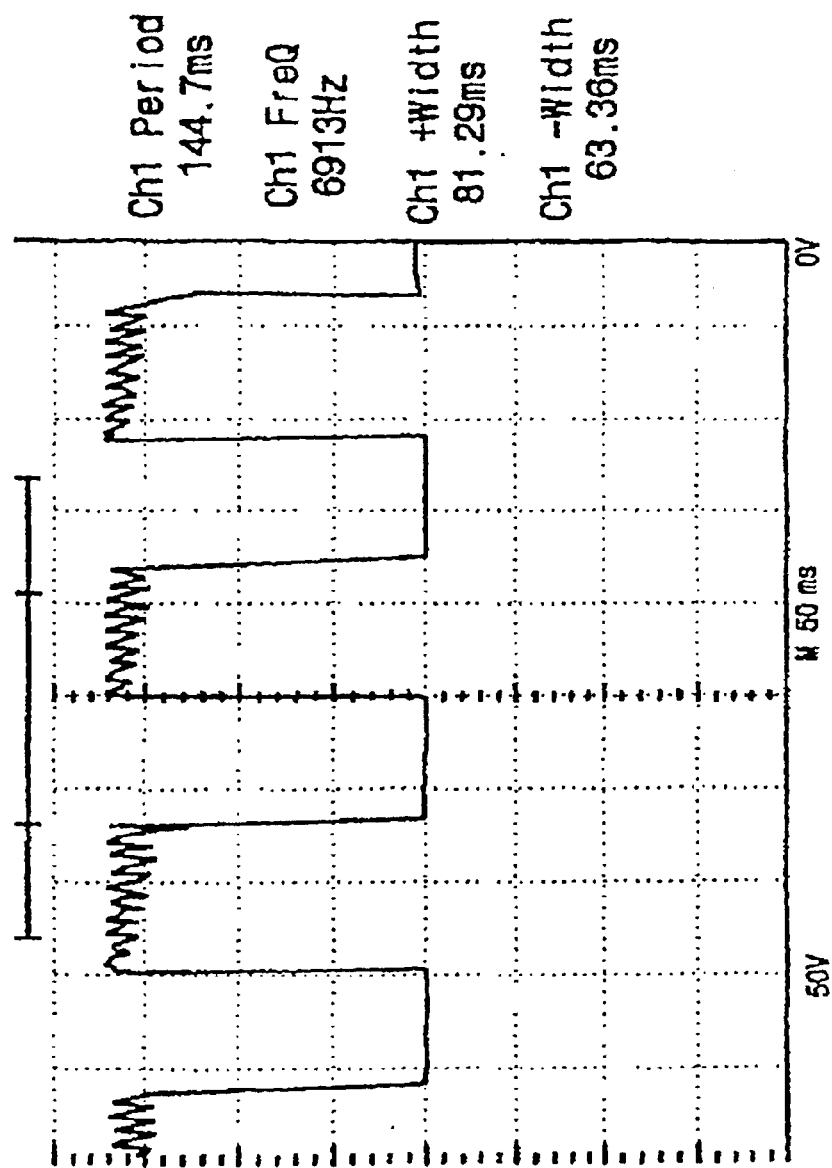
FIG. 2 is a waveform diagram of the voltage on a first coil in Embodiment Example 1.
Figure 3:
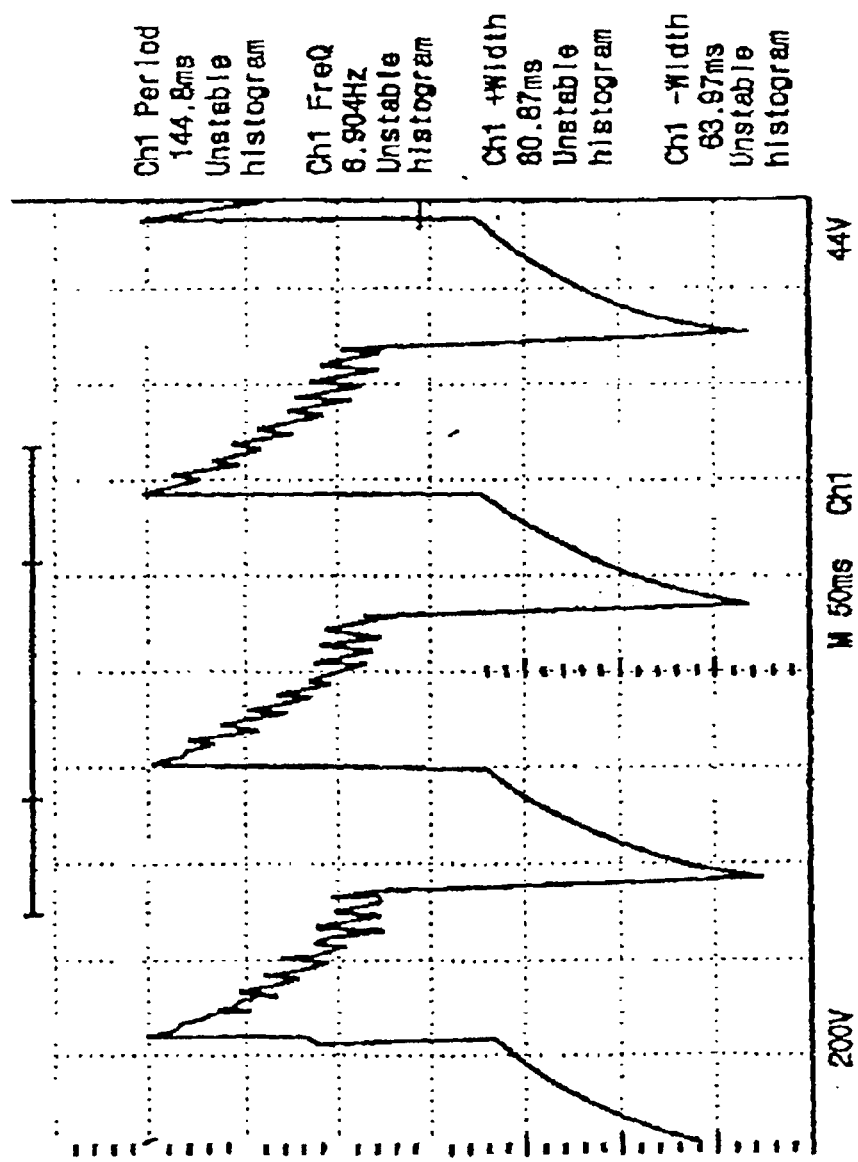
FIG. 3 is a waveform diagram of the voltage induced on a second coil in Embodiment Example 1.

When said pulsating DC signals are impressed on said first coil 1, a magnetic field with an intensity in the range of about 640 to about 1,000 gauss and pulsation in the range of about 3 to about 7 Hz is generated inside said chamber 4. A waveform of the voltage of the pulsating DC signals impressed on said first coil 1 is shown in FIG. 2. The voltage of the pulsating DC signals on said second coil 2 is shown in FIG. 3.

When a pulsating magnetic field, induced as described above, is generated in repetition for a given length of time, an arrangement of the molecules of the purified water contained in said vessel inside said chamber 4 may substantially change. At a certain length of time this change slows down and reaches the stage of saturation. The molecules of water form clusters and a phenomenon of condensation occurs. The time required for the arrangement of the molecules of water to reach saturation is termed the magnetization time.

The spin arrangement of hydrogen atoms persists, from the phenomenon of magnetic resonance, in which the hydrogen atoms undergo a spin arrangement under strong magnetism for an instant but immediately return to their original state. In this case, the hydrogen atoms exert an influence on the hydrogen ions peculiar to the dipolarity of the molecules of water and thereby the distances between the hydrogen atoms gradually decrease. This can be seen from the analysis of the NMR (nuclear magnetic resonance) in that the magnetic relaxation time, i.e., the time for the molecules of water to return to their original state by their rearrangement, increases. In air, the molecular arrangement of magnetized water returns almost to its original state in about 24 hours.

In an embodiment, the magnetization time, determined though experiments, may be set from about 6 to about 24 hours. The magnetization time may be preset at said control section 14. Said control section 14 determines whether the time measured at said time measuring section 12 is past the preset time for magnetization. If the measured time is over the preset time, said control section 14 controls said first coil 1 to stop impression of said DC pulsating signals on said first coil 1.

When magnetization of water is performed by impression of pulsating DC signals on said coils as described above, heat is generated in said first and second coils 1, 2 which raises the temperature inside said chamber 4. If the temperature inside said chamber 4 goes beyond a certain temperature (e.g., 30° C.), said temperature sensing section 10 may send a warning signal. In response to said signals from said temperature sensing section 10, said control section 14 controls said power supply section 6 such that the latter will impress a driving signal to said cooling section 8. This way the temperature inside said chamber 4 may be maintained consistently at a desired level.

Figure 4:
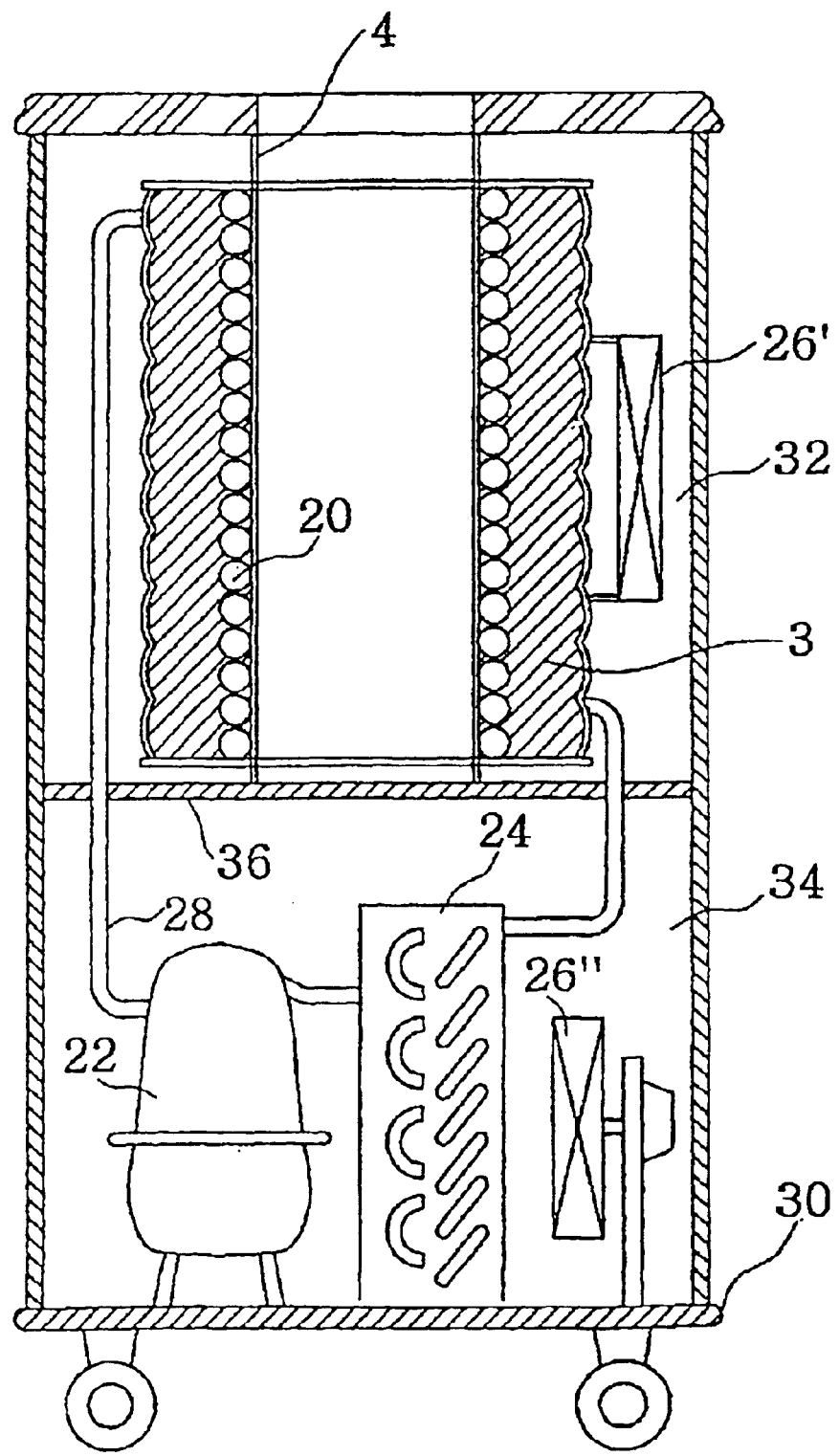
FIG. 4 is a drawing to illustrate a device for production of magnetized water in Embodiment Example 2.

FIG. 4 illustrates a device for production of magnetized water according to Embodiment Example 2. In this embodiment, a device, similar to Example 1, may include a chamber which houses a vessel containing purified water. The chamber may be wound with coils on its outside by a certain number of rounds. A shielding screen may cover said coils. A power supply section may convert the originally AC electricity into pulsating DC signals and impresses them on said coils to induce a magnetic field to the inside of said chamber. A temperature sensing section may be used to detect changes of temperature caused by said coils. A time measuring section may be used to measure the magnetization time of said purified water. A control section may control said power supply section to impress pulsating DC signals on said coils according to a temperature sensed by said temperature sensing section and the time measured by said time measuring section. Accordingly, repetitive detailed descriptions of similar components of Example 1 and Example 2 are omitted. The same reference numbers or symbols are used for the sake of convenience.

A main characteristic of a device in this embodiment is the method of cooling by compression of a refrigerant by evaporation. As shown in FIG. 4, a device may include cooling pipe 20, serving as a vaporizer, in the form of a screw between said chamber 4 and coil 3. Cooling pipe 20 may be connected by connection pipe 28 to compressor 22 and condenser 24. Refrigerant issuing from said cooling pipe 20 may resupply said cooling pipe 28 through said compressor 22 and said condenser 24 to augment the cooling. This may result in more efficient cooling of the coils and maintain the temperature of the magnetized water in the vessel in said chamber 4 at its proper level (e.g., from about 4° C. to about 8° C.).

To further improve cooling efficiency, cooling fan 26' may be placed outside of said coil 3 wound round said chamber 4. Cooling fan 26" may be placed outside said condenser 24. In addition to said cooling by compression by vaporization of said refrigerant, secondary cooling can be performed by cooling fans 26' and 26". In this embodiment, it may not be necessary to divide said coil 3 in two because of the increased cooling efficiency.

In FIG. 4, case 30 may be formed to house the above-mentioned constituents. Case 30 may include partitioning board 36. Space above said partitioning board 36 may form magnetizing chamber 32. Space below said partitioning board 36 may form cooling chamber 34. Said magnetizing chamber 32 may house chamber 4 wound with said coil 3, said cooling pipe 20, and said cooling fan 26'. Said cooling chamber 34 may house said compressor 22, said condenser 24, and said cooling fan 26" proximate a lower part of case 30.

An upper part of said case 30, housing said magnetizing chamber 32, may include an opening as large as a diameter of said chamber 4 to allow placement and removal of said vessel of water. Said opening may include a lid capable of opening or closing for protection of the magnetizing space and prevention of accidents.

Partitioning board 36 may include a number of openings for exhaust of heat and drainage of water. Said magnetizing chamber 32 and said cooling chamber 34 may be formed for smooth circulation of air.

For efficient operation and ease of use, said control section 14 may be placed at a position in the front or a side of said case 30. Said control section 14 (See FIG. 1) may include, for example, a panel (not shown in the drawings).

The bottom of said case 30 may be fitted with three or more castors for substantially easier movement of case 30.

Operation of the device in Embodiment Example 2 is substantially similar to the device in Example 1, except said coil for impression of the pulsating DC signals from said power supply section 6 (See FIG. 1) may be single in Example 2. Therefore, a detailed description of the operation of Example 2 is omitted here.

Figure 5:
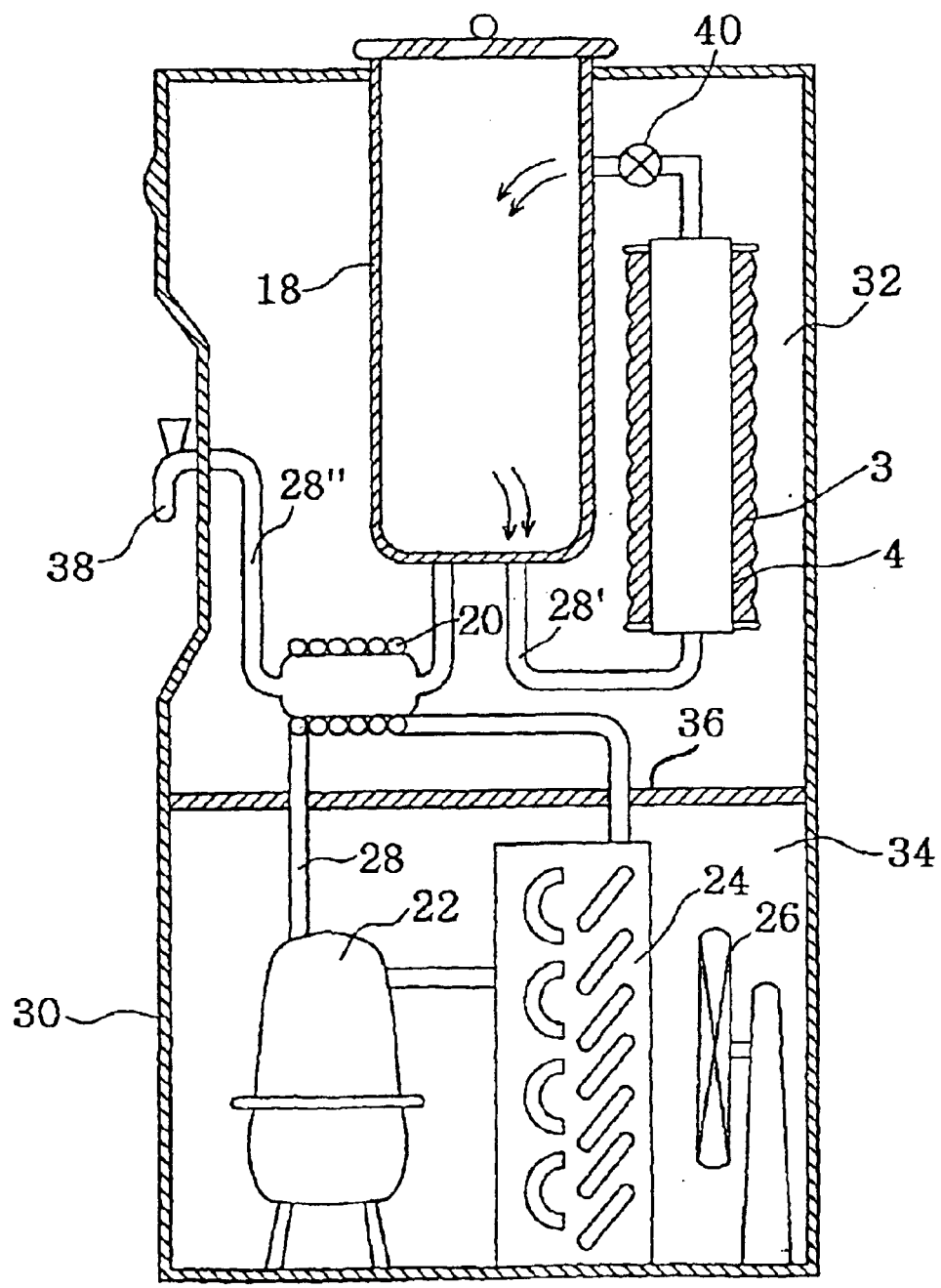
FIG. 5 is a drawing to illustrate a device for production of magnetized water in Embodiment Example 3.

FIG. 5 illustrates Embodiment Example 3. The device for production of magnetized water according to Embodiment Example 2 above is for use in the home or offices. The basic idea of production of magnetized water is substantially the same of the devices in Examples 1 and 2. The same reference numbers and symbols used in these earlier examples are in use in the descriptions below.

In Embodiment Example 3, said magnetizing chamber 32 contains water tank 18, separate from said chamber 4, for production of magnetized water. Water in said tank 18 is magnetized in said chamber 4, restored in said tank 18, and made available outside through an ordinary faucet 38.

An upper part of said magnetizing chamber 32 may include water tank 18 for storage of water. Water tank 18 may be coupled to said chamber 4 by connection pipe 28' joined to its upper and lower parts. Connection pipe 28', which connects said chamber 4 and said water tank 18, may include circulatory pump 40 for drawing water from said water tank 18 and for sending it back after magnetization for storage in said water tank 18. Said water tank 18 may be automatically supplied with water from an outside source. The supply may have to be mechanically controlled through constant measurement of the water in said tank 18 to maintain a certain quantity of water or magnetized water stored in it.

The bottom of said water tank 18 may include drain pipe 28" for discharge of the magnetized water though said faucet 38. Said drain pipe 28 may include cooling pipe 20 coupled to it for cooling the water being drained.

Said water tank 18 may be provided separately from said chamber 4 to receive a supply of water from an outside source. Said tank 18 may also restore the water after magnetization in said chamber 4. Said circulatory pump, which circulates the magnetized water, may be controlled by said control section 14 (See FIG., 1) in reference to magnetization time, quantity of used water, and other conditions. The magnetization time may be shortened, and the operation cycle of said circulatory pump lessened, to keep said water tank full of magnetized water.

Said chamber 4 may also include coil 20 and a shielding screen. A power supply section, a control section, a time measuring section, a temperature sensing section, a counter-electromotive force cut-off circuit, etc., may also be included as described previously. Redundant detailed descriptions of construction and operation are omitted as they are the same as in Embodiment Examples 1 and 2.

FIG. 5 shows an arrangement of a compressor, a condenser, a cooling fan, etc., inside said cooling chamber 34 formed in the lower part of said case 30. The embodiment may also include a cooling fan inside aforesaid magnetizing chamber.

An embodiment may also include castors (not shown its the drawings) under said case 30 for smooth movement of equipment. Additionally, said control section can be attached to the front or a side of said case 30 for handy operation of the device.

A device for production of magnetized water in this embodiment may provide magnetized water through said faucet 38 for both cold and hot drinking water in the home or offices.

The physicochemical properties of magnetized water produced by the embodiments of a device as described above are described below on the bases of experiments. The magnetized water used in the experiments was produced from deionized distilled water sealed in an airtight glass bottle inside said chamber described above.

The magnetic relaxation time was observed through NMR analysis. Irradiation of the water, with a magnetism pulsating at 7 Hz and an intensity between about 600 to about 1,000 gauss, continued for 24 hours. The temperature of said chamber 4 was substantially maintained at about 30° C.

Figure 6:
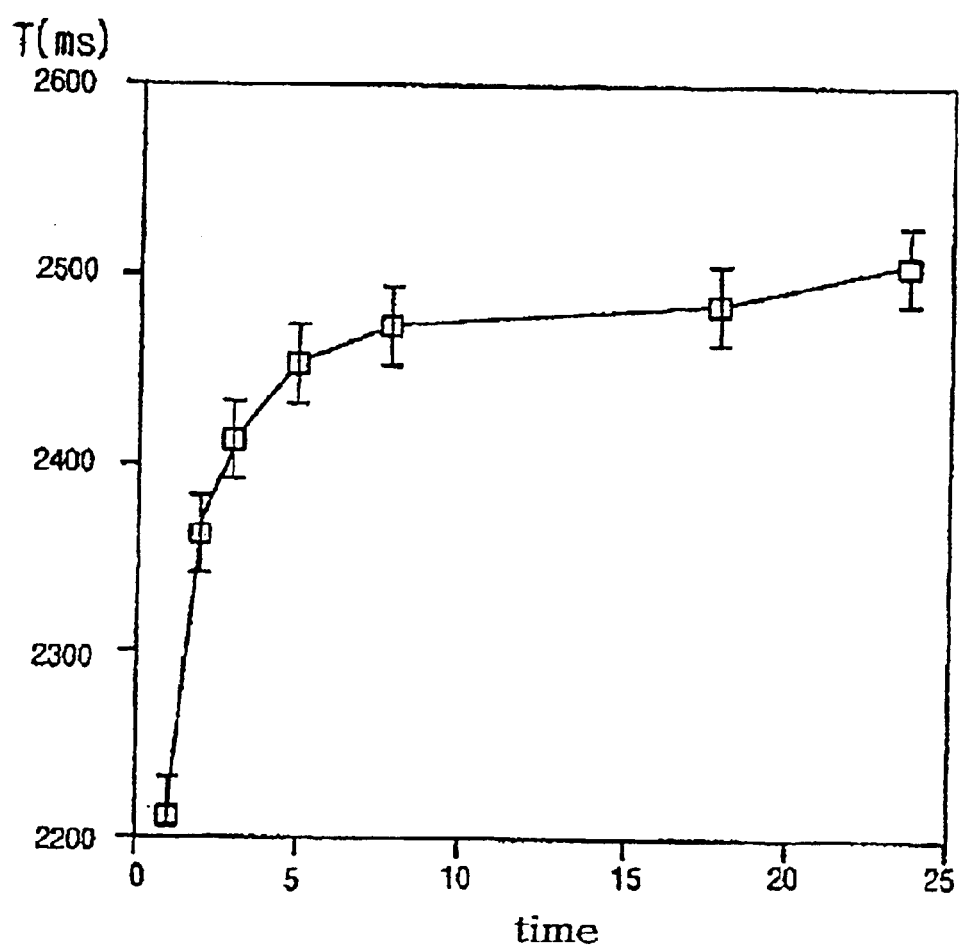
FIGS. 6 and 7 are drawings of magnetic relaxation time.
Figure 7:
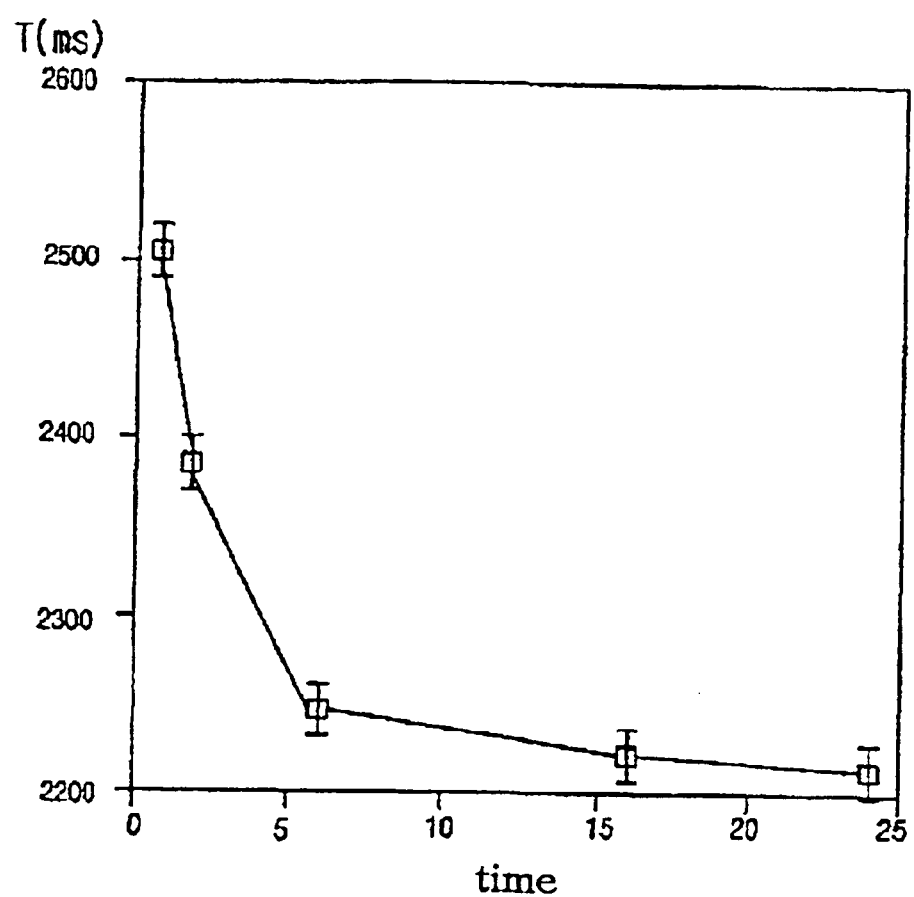

In FIGS. 6 and 7, the vertical and lateral axes respectively show the time required for magnetization of deionized distilled water and the time T corresponding with the time for the changes of the gaps between the hydrogen atom pairs in the molecules of deionized water. Time T serves as indices to the magnetic relaxation times.

As seen in FIG. 6, the magnetic relaxation time showed a sharp increase for the first five hours and a mild rise after eight hours. It reached its highest rate at about the $12^{th}$ hour since irradiation started, after which the rise became more sluggish until the $24^{th}$ hour. The magnetic relaxation decreased exponentially and functionally, as shown in FIG. 7, after irradiation was discontinued. The decrease was sudden and sharp for the first five hours after discontinuation of irradiation, and continued a sluggish decrease until the $24^{th}$ hour.

Figure 8:
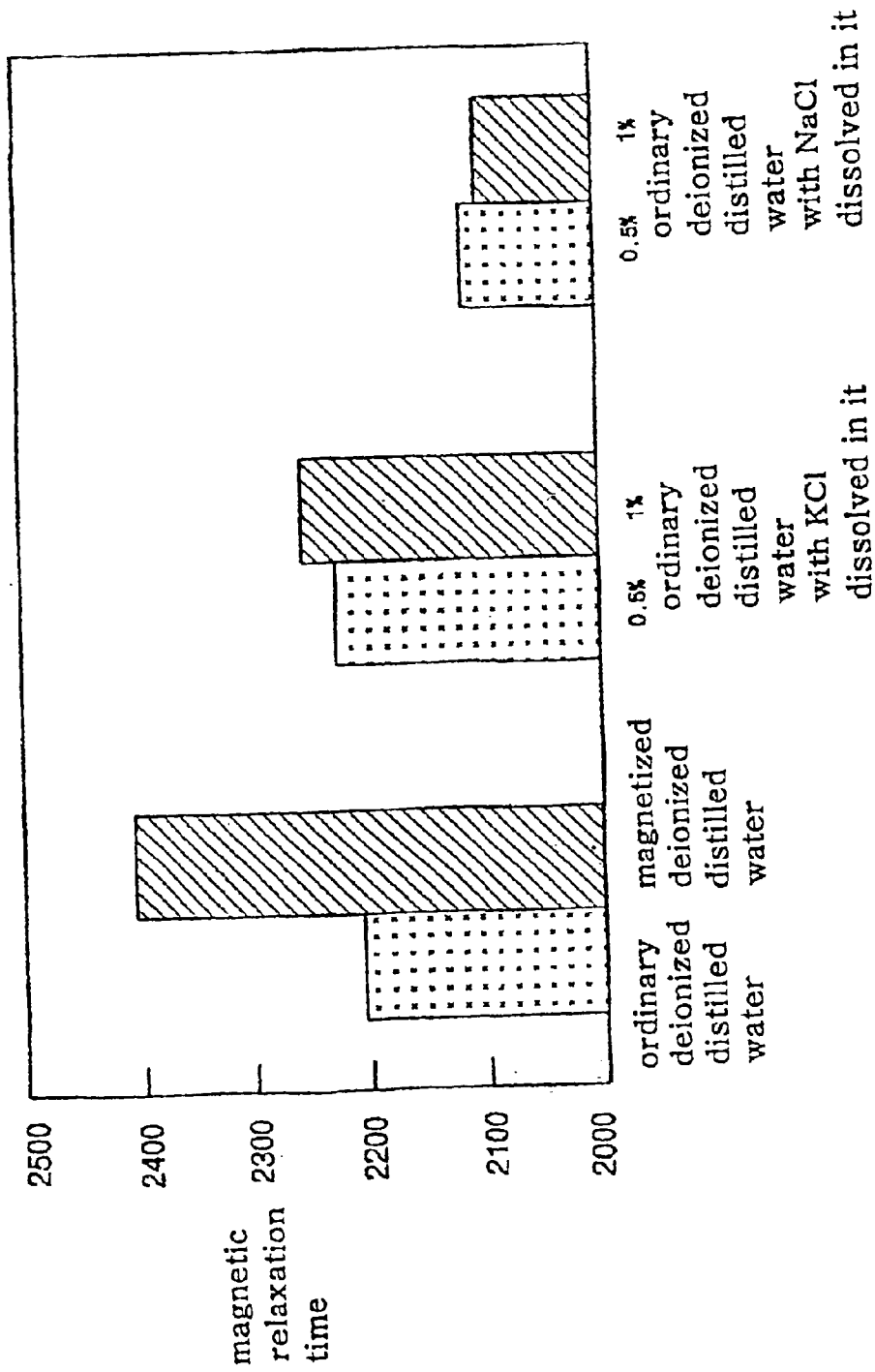
FIG. 8 is a drawing of time spent on magnetization.

As shown in FIG. 8, the magnetic relaxation time for the magnetized deionized distilled water substantially increased to 2,453.3±3.21 ms from 2,261.7±4.56 ms for ordinary deionized distilled water. The magnetic relaxation time increased to 2,243±1.31 ms when the magnetized deionized distilled water had 1.0% potassium chloride (KCl) dissolved in it compared to 2,118±7.61 ms for ordinary deionized distilled water with 0.5% sodium chloride (NaCl) dissolved in it.

Figure 9A:
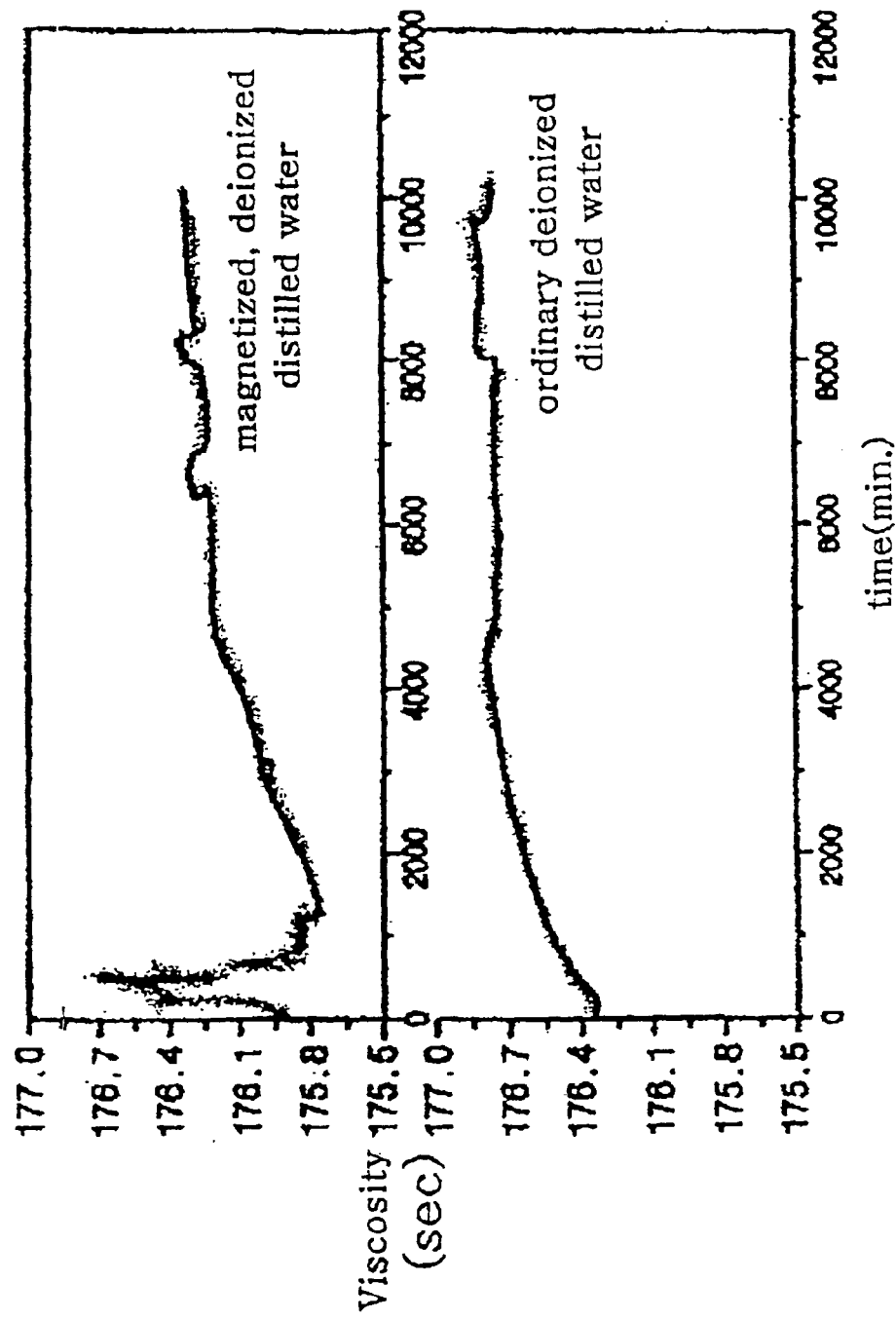
FIGS. 9a through 9f show changes in viscosity of water.

The deionized distilled water magnetized for 24 hours showed, as in FIG. 9a, a very rapid initial increase in viscosity compared with ordinary deionized distilled water. The quickly increased viscosity decreased to the level of ordinary deionized distilled water at about the $12^{th}$ hour. The change in viscosity became more distinct when sodium chloride (NaCl) and potassium chloride (KCl) were each added to the water, as shown in FIGS. 9b through 9f.

Figure 9B:
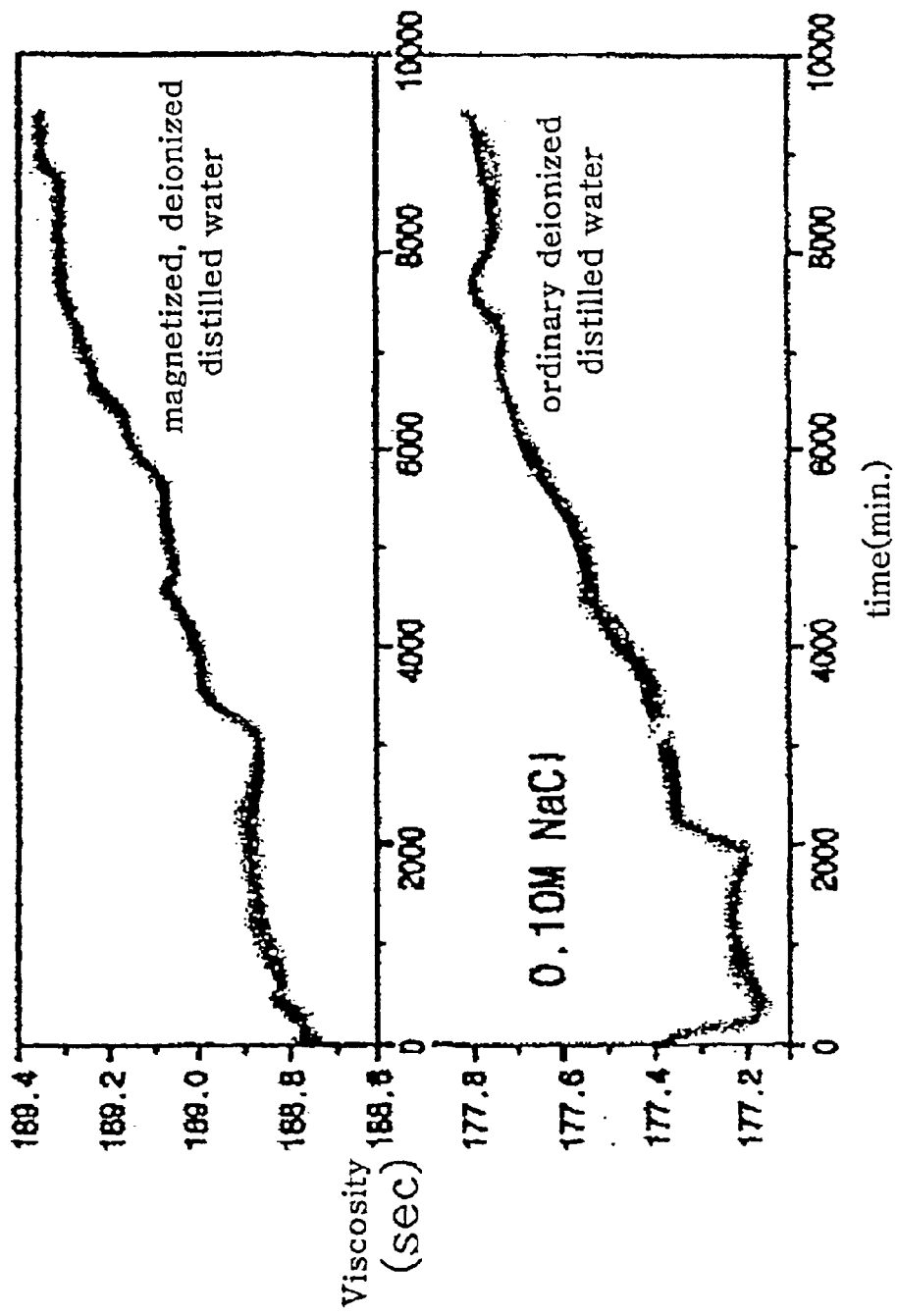
Figure 9C:
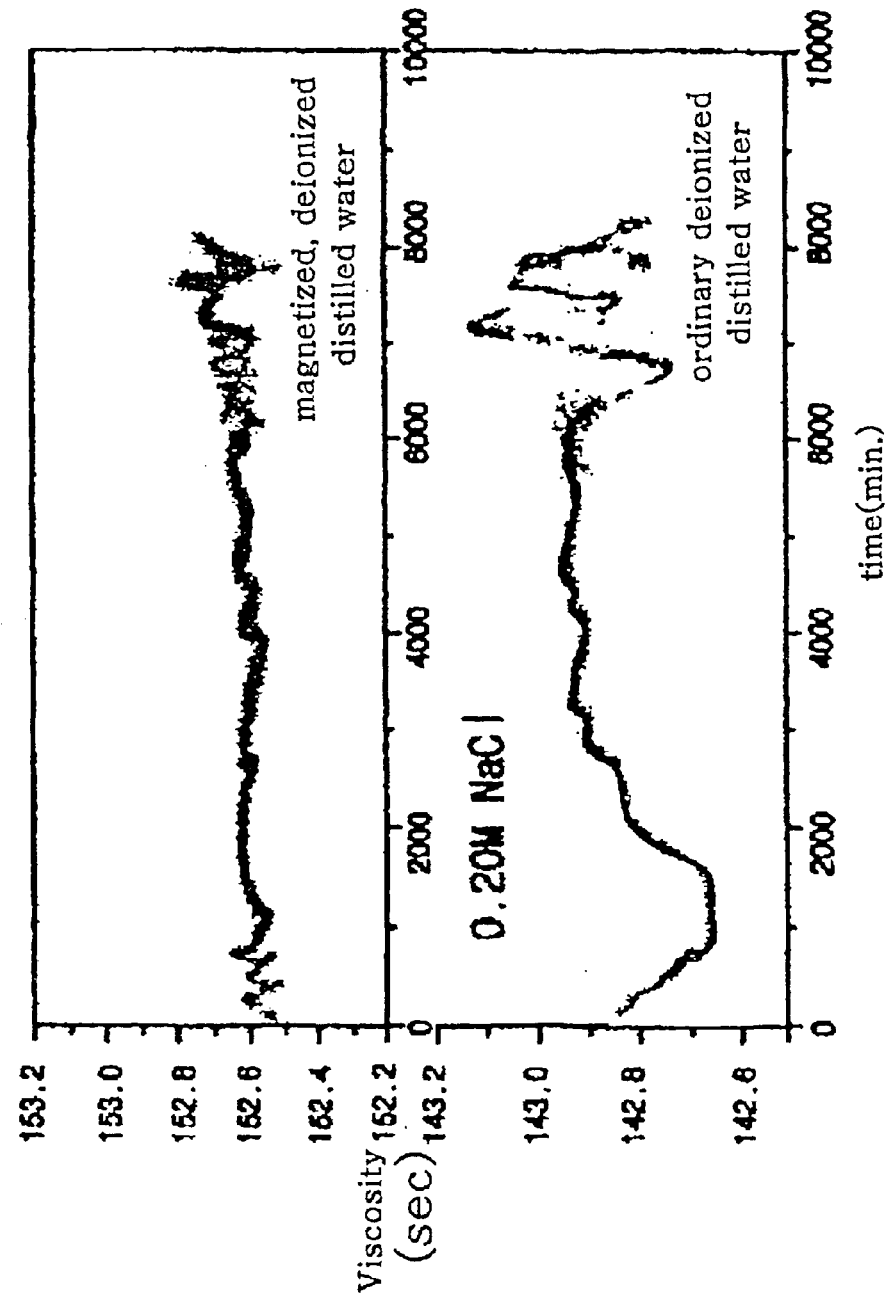

As seen in FIGS. 9b and 9c, ordinary deionized distilled water showed an initial decrease in viscosity as the added sodium chloride (NaCl) was increased by 0.1M and 0.2M, respectively. The magnetized deionized distilled water showed an initial decrease in viscosity when the sodium chloride (NaCl) was added by 0.1M, but showed substantially no initial decrease when the sodium chloride (NaCl) was added by 0.2M.

Figure 9D:
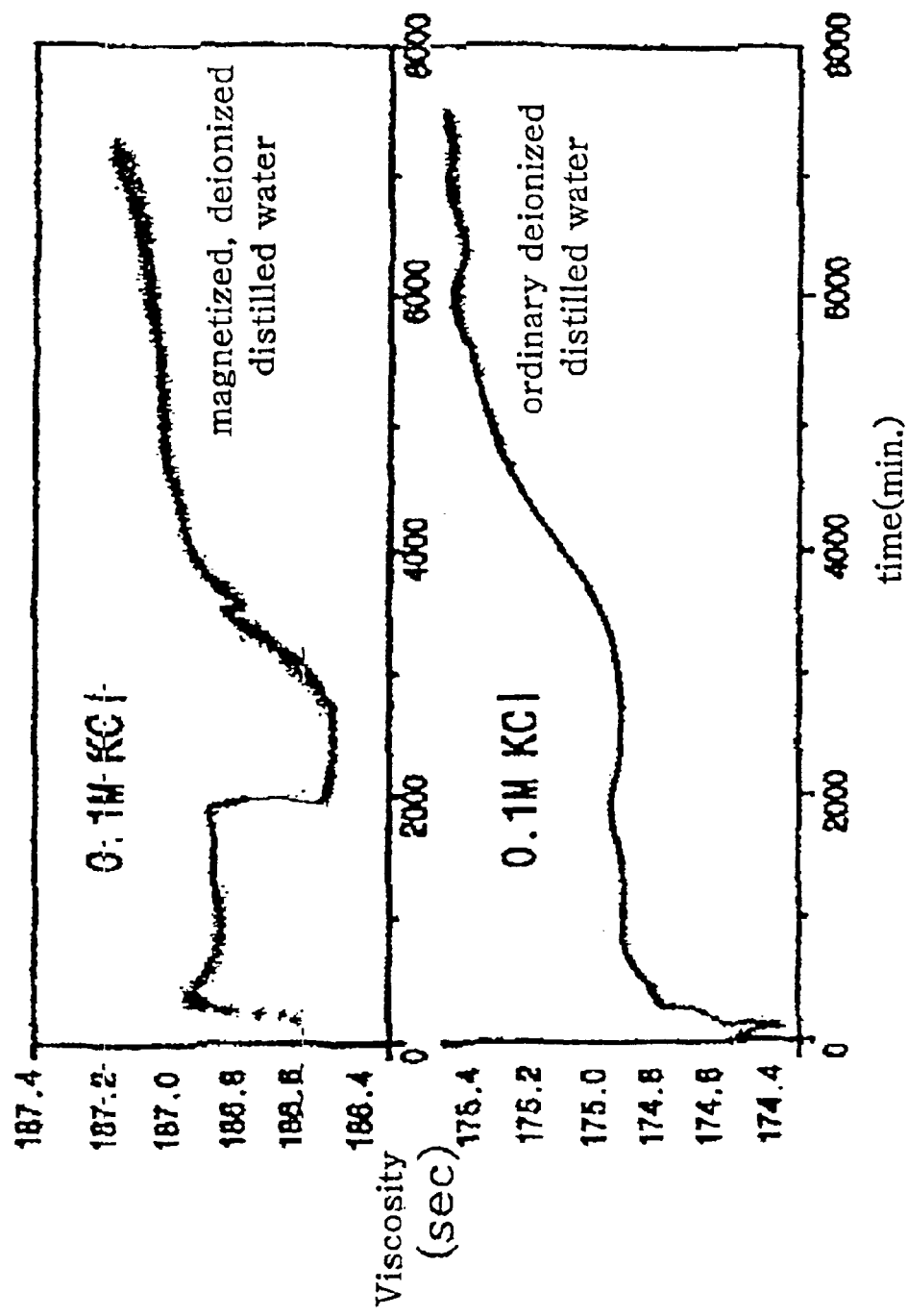
Figure 9E:
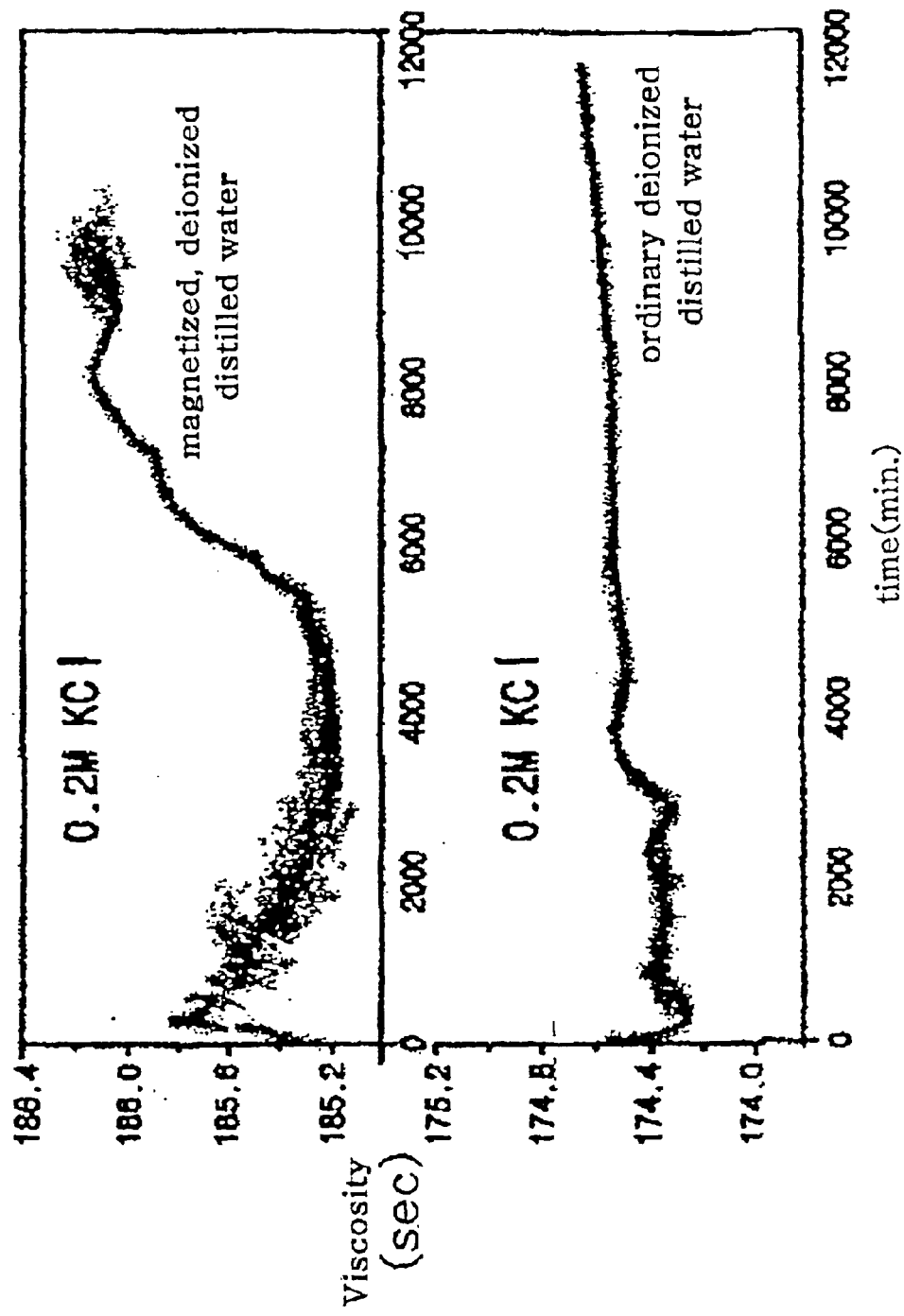
Figure 9F:
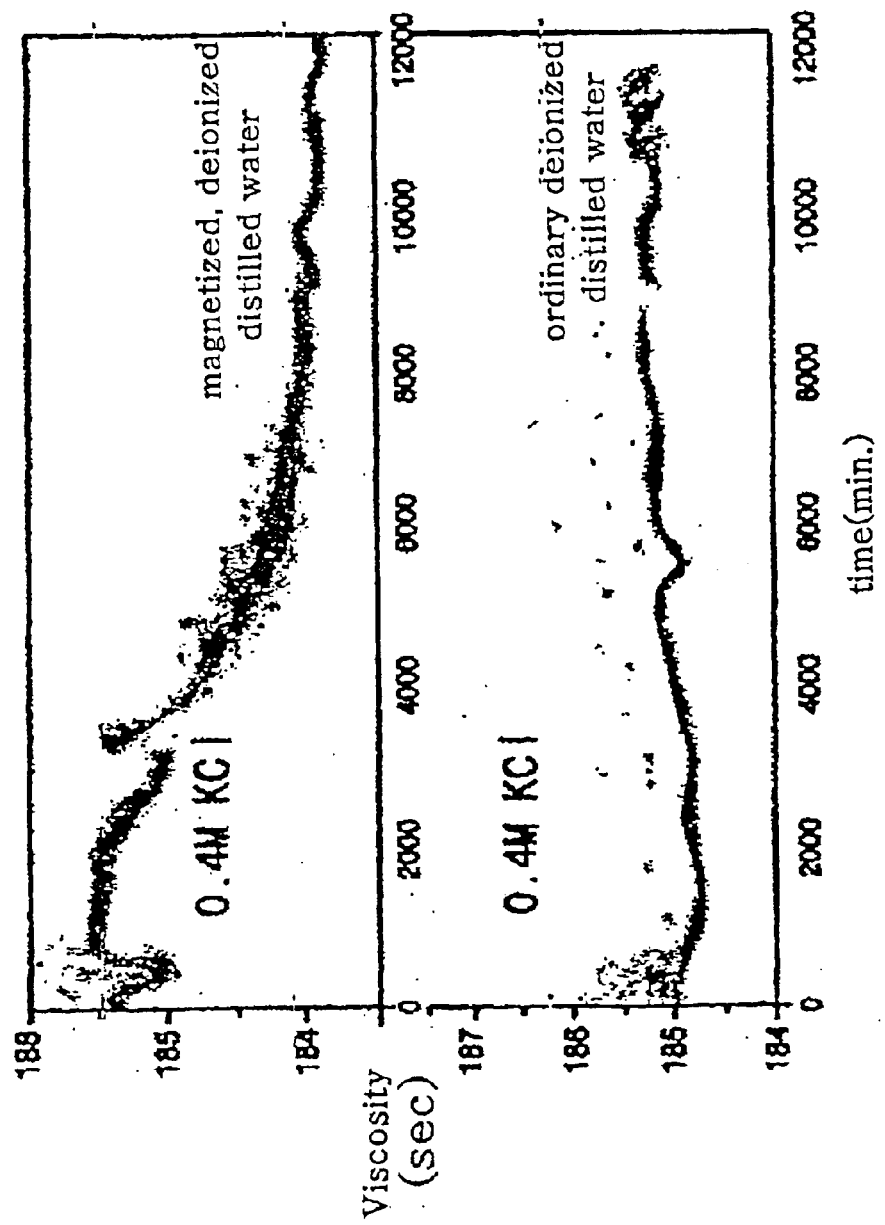

As shown in FIGS. 9d through 9f, an initial increase in viscosity was prominent in the magnetized deionized distilled water when potassium chloride (KCl) was added by 0.1M, 0.2M, and 0.4M. This increase in viscosity was especially prominent when 0.1M of KCl was added until about 2,000 minutes. After about 2,000 minutes, the increase in viscosity quickly returned to the level of ordinary deionized distilled water. When 0.2M of KCl was added, the initial increase in viscosity persisted until about 4,000 minutes. When 0.4M of KCl was added, the initial increase persisted until about 6,000 minutes.

Figure 10A:
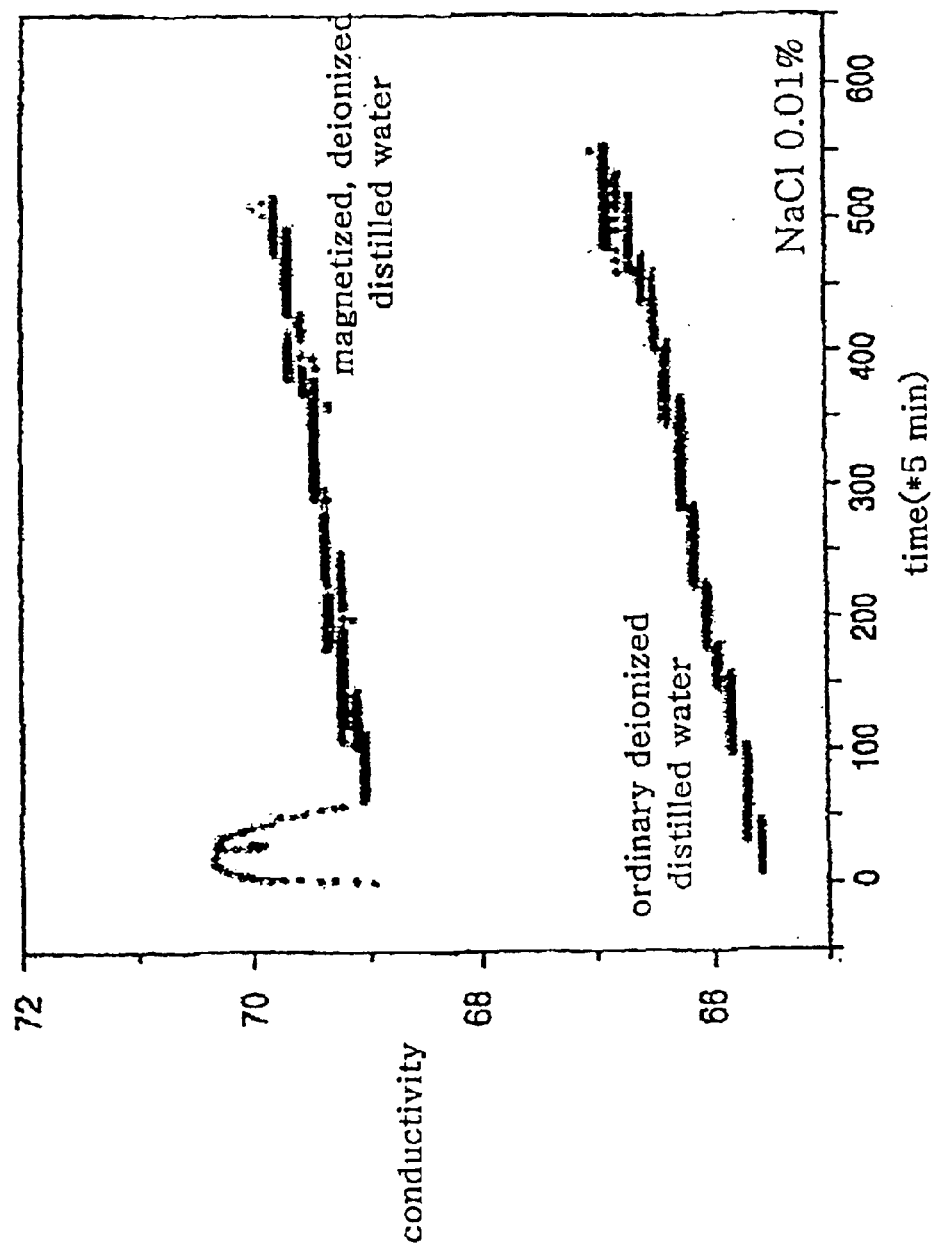
FIGS. 10a and 10b show conductivity rates of magnetized water
Figure 10B:
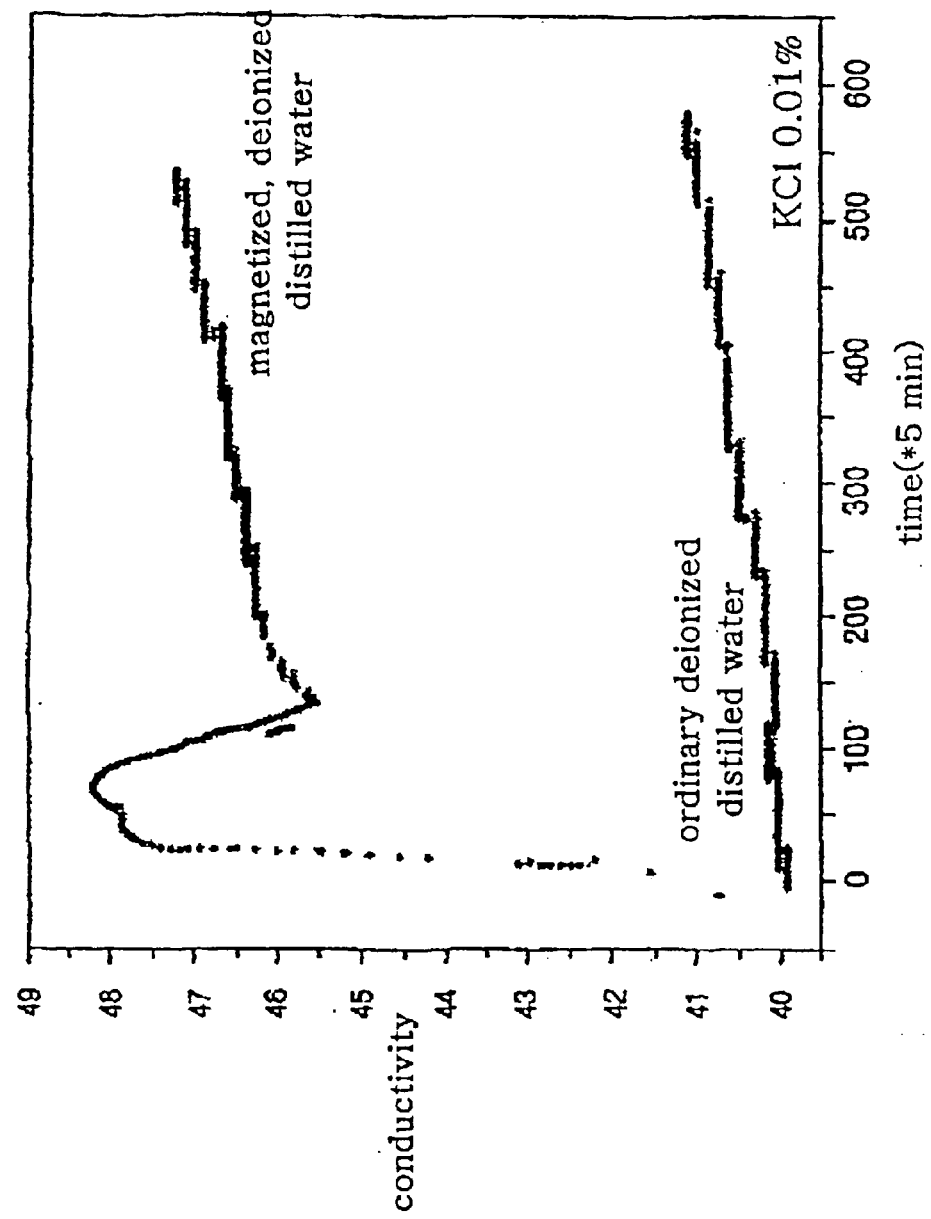

In both the magnetized water and the ordinary deionized distilled water, conductivity considerably decreased. In water purified of ordinary fresh water and in tap water, the decrease in conductivity was less. When sodium chloride and potassium chloride were added by 0.01% in dissolution, however, the conductivity instantly increased as shown in FIGS. 10a and 10b. The duration of the increased conductivity was slightly more in the case of potassium chloride than of sodium chloride. This phenomenon may be interpreted to mean that, in the case of ordinary water, NaCl or KCl is ionized and quickly rearranged along with the molecules of water. However, in the case of magnetized water, a sodium ion ($Na^+$) or potassium ion ($K^+$) instantly separates to deter the rise of conductivity because the molecules of water are in close arrangement by strong hydrogen bonding.

Figure 11A:
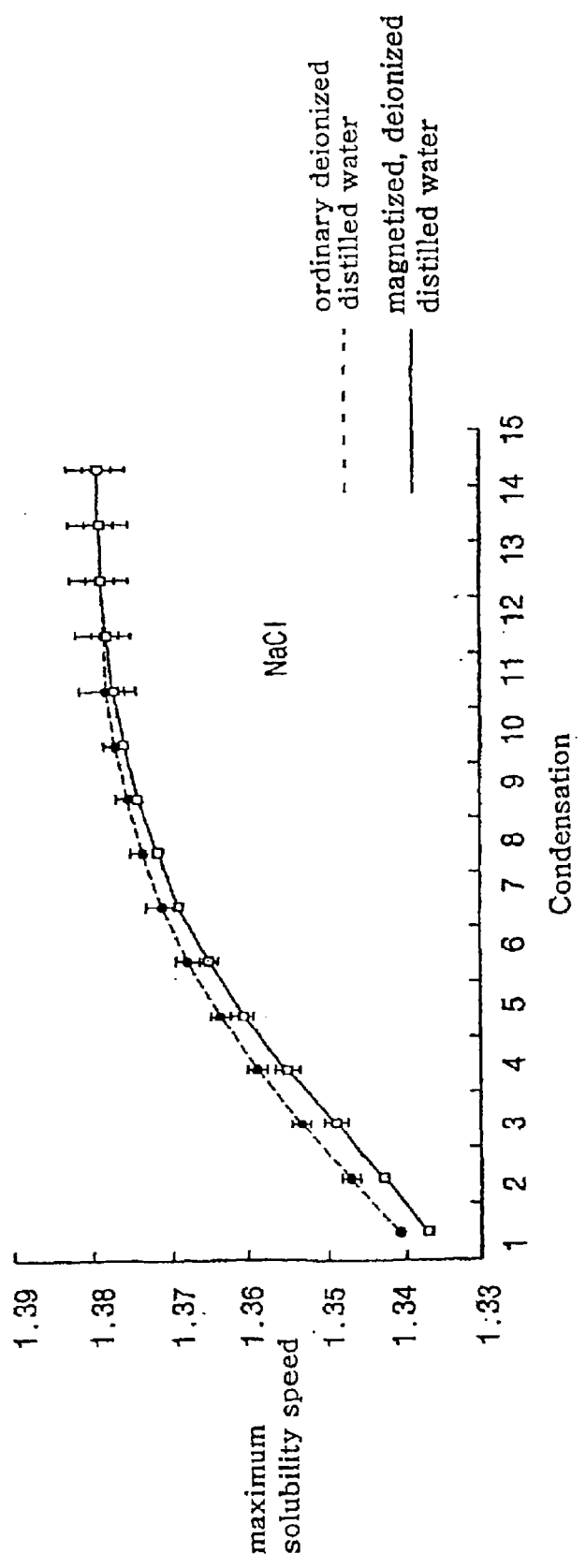
FIGS. 11a and 11b show solubility of magnetized water.
Figure 11B:
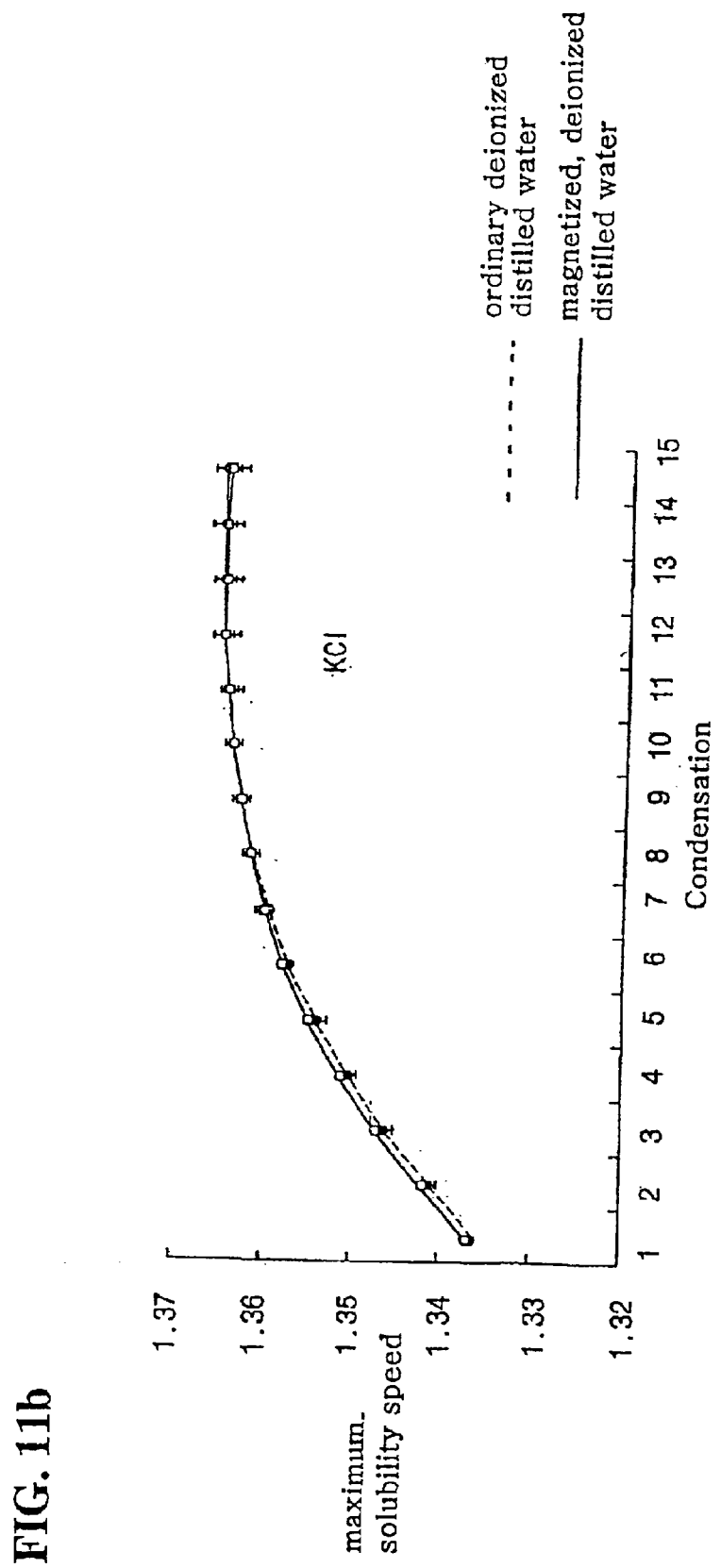

The maximum solubility speed of NaCl and KCl in water was measured with a Sephadex G-50 column in order to see the reaction speed of the solvent and solute. The maximum solubility speed of NaCl, as shown in FIG. 11a, substantially decreased in the case of the magnetized deionized distilled water compared to ordinary deionized distilled water. The difference in maximum solubility speeds of ordinary deionized distilled water and magnetized water became smaller as the condensation of NaCl approached saturation. The maximum solubility speed of KCl increased in the magnetized deionized distilled water slightly more than in ordinary deionized distilled water, as shown in FIG. 11b. The difference in maximum solubility speeds of ordinary deionized distilled water and magnetized water disappeared as the condensation of KCl increased to approach saturation.

Experiments also showed that the structural composition of crystal formation in gypsum was denser and more compact when the gypsum was hardened with magnetized deionized distilled water compared to being hardened with ordinary deionized distilled water. The larger crystal construction was obtained faster using magnetized deionized distilled water compared to using ordinary deionized distilled water. When NaCl or KCl was added by 1% and 5%, the magnetized deionized distilled water formed substantially denser, larger crystal constructions than did ordinary deionized distilled water.

Figure 12:
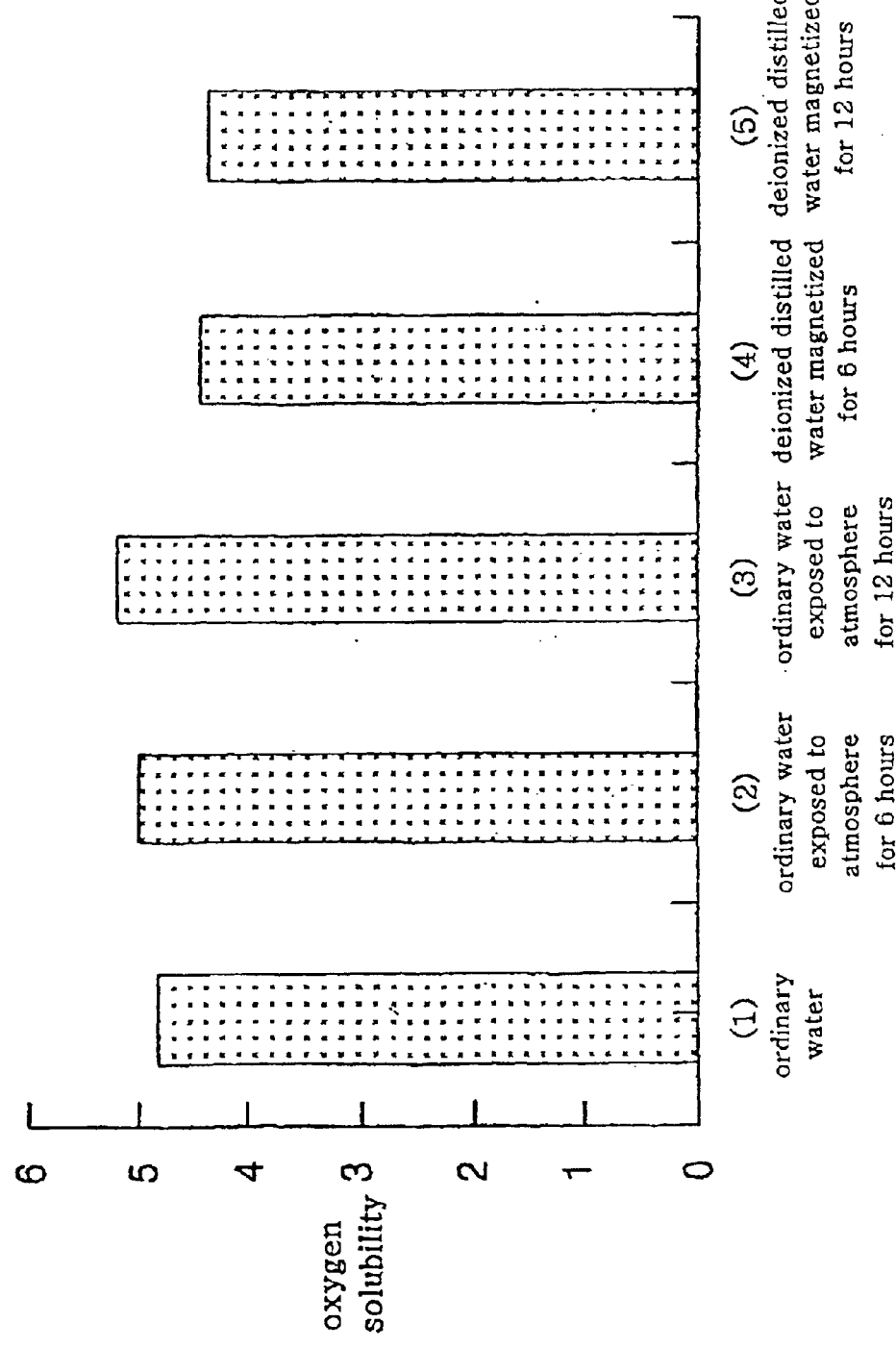
FIG. 12 is a table of oxygen solubility of magnetized water.

In FIG. 12, (1) in the lateral axis indicates the case of ordinary water, (2) of ordinary water exposed to atmosphere for six hours, (3) of ordinary water exposed for 12 hours, (4) of the deionized distilled water magnetized for six hours, and (5) of the deionized distilled water magnetized for 12 hours. The vertical axis shows the oxygen solubility. As seen in FIG. 12, the oxygen solubility of magnetized deionized distilled water was lower than the oxygen solubility of ordinary deionized distilled water. When natural fresh water was magnetized, the hydrogen solubility was also lower.

Figure 13:
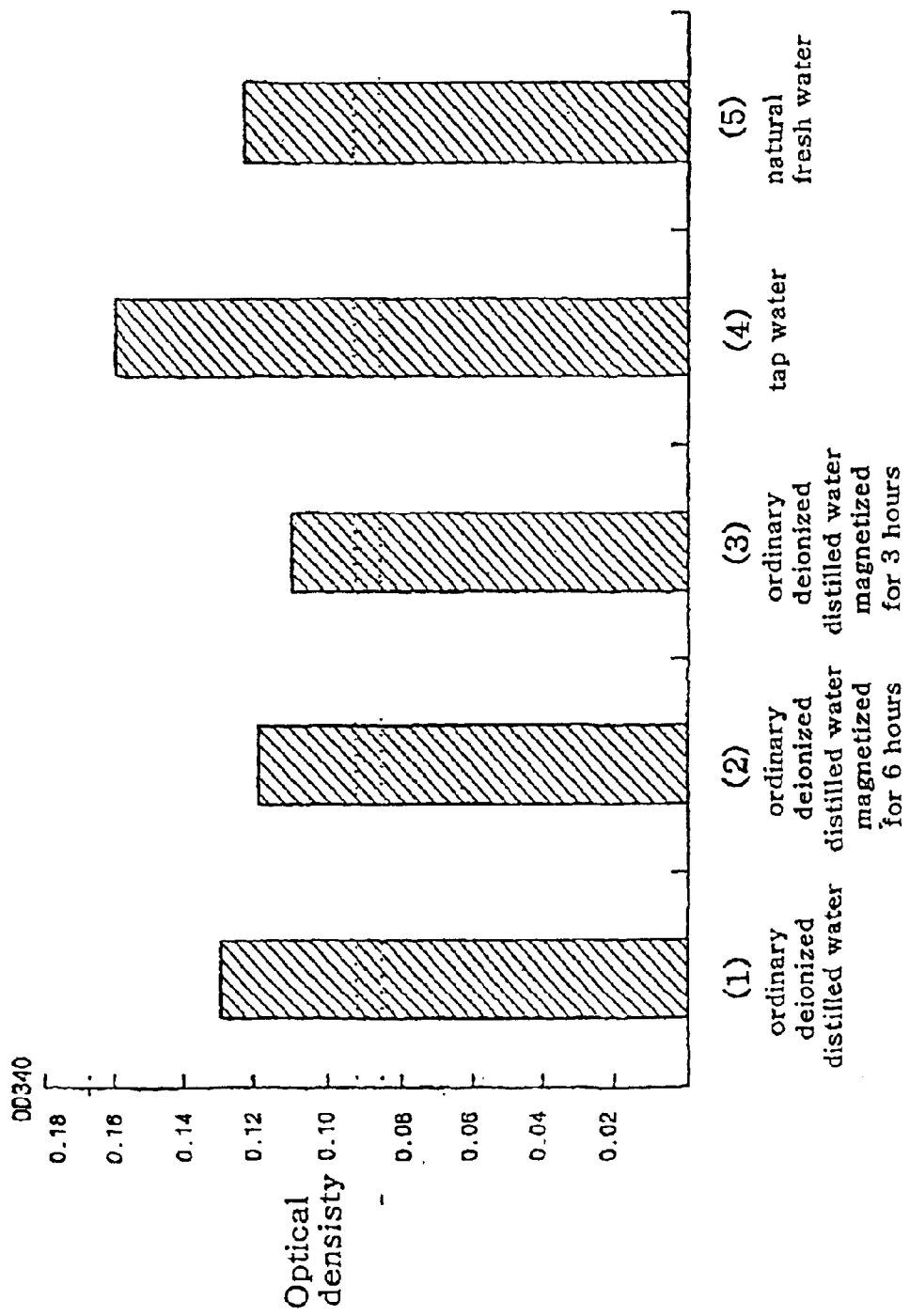
FIG. 13 is a table of free radical activity of magnetized water.

In FIG. 13, (1) in the lateral axis indicates the case of ordinary deionized distilled water, (2) of ordinary deionized distilled water magnetized for six hours, (3) of ordinary deionized distilled water magnetized for three hours, (4) of tap water, and (5) of natural fresh water. The vertical axis indicates the optical density (OD) as a measure of the free radical activity of the magnetized water. As shown in FIG., 13, the coloring reaction of the water by p-nitrophenylacetate showed a lower OD in the case of the magnetized water compared to ordinary deionized distilled water. The difference between the OD of ordinary deionized distilled water and the magnetized water became smaller as magnetization proceeded.

The polymerase chain reaction (PCR) and the enzymatic reaction of restriction endonuclease by the use of the magnetized water showed that production of DNA increased in the PCR which used the magnetized water compared to ordinary deionized distilled water. When Taq (thermos aquatious) was gradually decreased, the PCR products slightly increased when magnetized water was used compared to when ordinary deionized distilled water was used. When template DNA was gradually decreased, a substantial increase of PCR products was observed where the magnetized water was used. The enzymatic reaction activity of restriction endonuclease was also greater in the case of the magnetized water than compared to ordinary deionized distilled water.

INDUSTRIAL APPLICABILITY

As described above, application of the device for magnetizing water and the method may be used to rearrange the molecules of water by the use of a pulsating magnetic field, even without the aid of other inorganic salts. Magnetizing water may facilitate formation of clusters of water molecules for its enrichment and, moreover, to maintain such characteristic properties of the magnetized water for some time (6–24 hours). As such, obtainment of magnetized water does not merely activate provision of nutrients demanded by living bodies but also stimulates their metabolism.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A device for producing magnetized water, which comprises:
    (a) a chamber, which houses a vessel containing purified water and whose outer wall is wound with coils of wire by a certain number of rounds;
    (b) a means of supplying power, which converts alternating current of electricity into pulsating direct current signals and impresses said signals on said coils;
    (c) a means of cooling installed outside said chamber;
    (d) a means of sensing the changes of temperature generated by said coils;
    (e) a means of measuring the time spent on magnetization of said purified water; and,
    (f) a means of controlling said means of supplying power to stop impression of said DC pulsating signals when the magnetization time measured by said means of measuring the time exceeds the preset magnetization time.

2. The device for producing magnetized water according to claim 1, wherein said coils wound onto said chamber comprises a first coil which receives impression of said DC pulsating signals from said means of supplying power, and a second coil which is connected with said first coil at a certain interval.

3. The device for producing magnetized water according to claim 2, wherein said first and second coils are so adjusted in their numbers of rounds as against said DC pulsating signals that magnetism of intensity to satisfy the range of 600 to 1,000 gauss and pulsating at three to seven Hz per second can be induced.

4. The device for producing magnetized water according to claim 2, wherein said first and second coils are enwrapped with a shield screen to cut off harmful electromagnetism which can be generated while said pulsating magnetism is induced.

5. The device for producing magnetized water according to claim 1, wherein said means of cooling comprises a cooling pipe winding in the form of a screw between said chamber and coils, and a connecting pipe so connected that refrigerant of said cooling pipe can circulate through a compressor, and a condenser, and back to said cooling pipe.

6. The device for producing magnetized water according to claim 5, wherein a partition board is laterally placed inside a case which houses the device for producing magnetized water so that in the upper space above said partition board said chamber wound with said coils and said cooling pipe are placed and in the lower space below said partition board said compressor and said condenser are placed.

7. The device for producing magnetized water according to claim 6, wherein in the upper part of said case an opening of the size of the diameter of said chamber is formed, and a lid is set so that said opening can be opened or closed.

8. The device for producing magnetized water according to claim 5, wherein a cooling pan is placed outside said condenser and said chamber.

9. The device for producing magnetized water according to claim 1, wherein said coils and said means of supplying power respectively have a counter-electromotive force cut-off circuit formed to cut off the counter-electromotive force caused by said coils.

10. The device for producing magnetized water according to claim 1, wherein said means of supplying power converts alternating current of electricity into DC pulsating signals pulsating at three through seven Hz and outputs the same.

11. The device for producing magnetized water according to claim 1, wherein said chamber is made of nonferrous metal materials.

12. A device for producing magnetized water, which comprises:
    (a) a water tank containing purified water;
    (b) a chamber, which is connected to said water tank and whose outer wall is wound with coils by a certain number of rounds;
    (c) a circulatory pump which circulates water through said water tank and said chamber;
    (d) a means of supplying power which converts alternating current of electricity into DC pulsating signals of certain frequency and impresses them on said coils;
    (e) a means of cooling installed outside said chamber;
    (f) a means of sensing the changes of temperature generated by said coils;
    (g) a means of measuring the time spent on magnetizing said purified water;
    (h) a means of controlling said means of supplying power to stop impression of said DC pulsating signals when the magnetization time measured by said means of measuring the time exceeds the preset magnetization time; and,
    (i) a means of discharging water in said water to the outside.

13. The device for producing magnetized water according to claim 12, wherein said means of cooling comprises a cooling pipe wound round said means of discharging, and a connecting pipe so connected that refrigerant of said cooling pipe can circulate through a compressor, and a condenser, and back to said cooling pipe.

14. The device for producing magnetized water according to claim 13, wherein a partition board is laterally placed inside a case which houses the device for producing magnetized water so that in the upper space above said partition board said chamber wound with said coils and said cooling pipe are placed and in the lower space below said partition board said compressor and said condenser are placed.

15. The device for producing magnetized water according to claim 14, wherein said partition board has a number of holes dug in it.

16. The device for producing magnetized water according to claim 13, wherein a cooling pan is placed outside said condenser and said chamber.

17. The device for producing magnetized water according to claim 12, wherein said coils and said means of supplying power respectively have a counter-electromotive force cut-off circuit formed to cut off the counter-electromotive force caused by said coils.

18. The device for producing magnetized water according to claim 12, wherein said means of supplying power converts alternating current of electricity into DC pulsating signals pulsating at three through seven Hz and outputs the same.

19. The device for producing magnetized water according to claim 12, wherein said chamber is made of nonferrous metal materials.

20. A method for producing magnetized water, which comprises impressing pulsating magnetism of a certain intensity and frequency onto purified water contained in a tightly closed vessel, and continuing said impression so far as the spin alignment of molecules of water can persist with almost no change, thus making said water molecules to form clusters, and thereby obtaining enriched magnetized water.

21. The method for producing magnetized water according to claim 20, wherein said purified water receives impression of said pulsating magnetism in the range of 6 to 24 hours.

22. The method for producing magnetized water according to claim 20, wherein said pulsating magnetism is in the range of 600 through 1,000 gauss in intensity.

23. The method for producing magnetized water according to claim 20, wherein said pulsating magnetism is in the range of frequency of three to seven Hz.

24. A device for producing magnetized water, comprising:

a chamber configured to house a vessel of purified water, the chamber comprising an outer wall wound by a number of rounds with coils of wire;

a power supply coupled to the chamber, the power supply configured to convert alternating current into pulsating direct current signals and impress the direct current signals on the coils of wire;

a cooling source configured to cool the coils of wire;

a temperature sensor configured to sense changes in temperature of the chamber;

a timer configured to measure time of magnetization of the purified water; and a controller;

wherein the controller is configured to stop impression of the signals on the coils by the power supply when the time of magnetization of the purified water reaches a preset magnetization time.

* * * * *